(12) United States Patent
Kanada (10) Patent No.: US 8,760,677 B2
(45) Date of Patent: Jun. 24, 2014

(54) DEVICE CONTROL APPARATUS, DEVICE CONTROL PROGRAM, AND SERVER

(75) Inventor: Kentaro Kanada, Ina (JP)

(73) Assignee: Seiko Epson Corporation, Tokyo (JP)

(*) Notice: Subject to any disclaimer, the term of this patent is extended or adjusted under 35 U.S.C. 154(b) by 641 days.

(21) Appl. No.: 13/038,317

(22) Filed: Mar. 1, 2011

(65) Prior Publication Data

US 2011/0216348 A1  Sep. 8, 2011

(30) Foreign Application Priority Data

Mar. 3, 2010  (JP) ................................ 2010-046300

(51) Int. Cl.
*G06K 15/00* (2006.01)
*G06F 3/12* (2006.01)

(52) U.S. Cl.
USPC ................ 358/1.14; 358/1.15; 726/2; 726/4; 726/17; 726/21

(58) Field of Classification Search
None
See application file for complete search history.

(56) References Cited

U.S. PATENT DOCUMENTS

| | | | |
|---|---|---|---|
| 5,692,111 A * | 11/1997 | Marbry et al. ............... | 358/1.15 |
| 5,960,167 A * | 9/1999 | Roberts et al. ............... | 358/1.15 |
| 6,909,518 B2 * | 6/2005 | Miller et al. ................ | 358/1.13 |
| 2002/0051186 A1 * | 5/2002 | Takahashi .................... | 358/1.15 |
| 2002/0089693 A1 * | 7/2002 | Maruyama ................... | 358/1.15 |
| 2004/0073684 A1 * | 4/2004 | Jodra et al. .................... | 709/228 |
| 2004/0130740 A1 * | 7/2004 | Lawrence et al. ............ | 358/1.13 |
| 2006/0230448 A1 * | 10/2006 | Iwakawa et al. ............... | 726/17 |
| 2007/0070417 A1 * | 3/2007 | Ito .............................. | 358/1.15 |
| 2008/0244043 A1 | 10/2008 | Kawai | |
| 2009/0201547 A1 * | 8/2009 | Noguchi et al. ............. | 358/1.15 |
| 2010/0171973 A1 * | 7/2010 | Kimura ....................... | 358/1.14 |

FOREIGN PATENT DOCUMENTS

| | | | |
|---|---|---|---|
| CN | 101320316 A | | 12/2008 |
| JP | 2001-31280 A | | 11/2001 |
| JP | 2005-043996 A | | 2/2005 |

* cited by examiner

*Primary Examiner* — King Poon
*Assistant Examiner* — Vincent Peren
(74) *Attorney, Agent, or Firm* — Kilpatrick Townsend & Stockton LLP (57) ABSTRACT

A device control apparatus includes: a usage instruction acceptance unit that accepts a usage instruction for a device; a determination unit that determines whether or not the device is a registered device that has been registered in a server based on registration information obtained from the server, and determines whether or not the device is a loaner device for the registered device based on loaner device information; a notification unit that performs a notification prompting a user to register the device as a registered device in the server; a prohibition unit that prohibits the device from being used in accordance with the usage instruction; and a permission unit that permits the device to be used in accordance with the usage instruction.

3 Claims, 4 Drawing Sheets

DEVICE CONTROL APPARATUS, DEVICE CONTROL PROGRAM, AND SERVER

This application claims priority to Japanese Patent Application No. 2010-046300, filed Mar. 3, 2010, the entirety of which is incorporated by reference herein.

BACKGROUND

1. Technical Field

The present invention relates to techniques for allowing the use of registered devices.

2. Related Art

JP-A-2001-312380 discloses a technique for prohibiting the printing of a print job in the case where a user ID is not registered.

Furthermore, JP-A-2005-43996 discloses a method where when a printer has malfunctioned, a user's printer is exchanged with a loaner device, and the user's printer is then taken to a repair center and repaired.

If printing is prohibited in the case where registration has not been carried out, as in JP-A-2001-312380, when the user's printer has been exchanged for a loaner device, as in JP-A-2005-43996, it is necessary for the user to register the loaner device as well. There has thus been a problem in that forcing a user to perform the registration operation for a loaner device that will be used only temporarily has been disagreeable from the point of view of the users. Furthermore, loaner devices owned by a manufacturer (or a service center) normally cannot be registered, and there is thus an additional problem in that users may be forced to carry out the registration operations in vain.

SUMMARY

An advantage of some aspects of the invention is to avoid causing a user to perform registration operations for a loaner device.

A device control apparatus according to an aspect of the invention determines, when a usage instruction has been accepted, whether or not a device is a registered device that has been registered, based on registration information obtained from a server. Furthermore, the device control apparatus determines whether or not the device is a loaner device for the registered device based on loaner device information. In the case where it has been determined that the device is not the registered device and that the device is not a loaner device for the registered device, the device control apparatus performs a notification prompting a user to register the device as a registered device in the server. However, in the case where it has been determined that the device is the registered device or that the device is a loaner device for the registered device, the notification is not carried out. Accordingly, by not performing the notification prompting the user to register the device as the registered device in the server in the case where the device is a loaner device for the registered device as well, carrying out the prompt to register the loaner device in the server can be avoided. In other words, imparting a sense of displeasure in the user by prompting the user to register the loaner device can be avoided, and the wasteful activity of registering the loaner device can be prevented.

According to another aspect of the invention, in the case where it has been determined that the device is not the registered device and that the device is not a loaner device for the registered device, it is desirable for the device control apparatus to perform a notification prompting the user to register the device as a registered device in the server, and to prevent the device from being used according to the usage instruction. Doing so makes it possible to make the registration of the device a prerequisite for using the device, which makes it possible to encourage the registration of the device.

According to another aspect of the invention, it may be determined whether or not the device is a loaner device for a registered device based on loaner device information obtained from the server. Accordingly, the loaner device information can be managed in the server, making it possible to flexibly accommodate the addition and so on of loaner devices.

In addition to the aforementioned device control apparatus, the invention can be carried out as a device control method, a device control program, a recording medium for a program, and so on. Of course, the recording medium may be a magnetic recording medium or a magneto-optical recording medium, and all other recording media that may be developed hereafter apply in the same manner. Furthermore, the order of operations disclosed in the aspect of the invention is not limited to the disclosed order as long as altering the order will not cause technical issues; the operations may thus be executed simultaneously, in the reverse order, or may be executed in a non-continuous manner. Furthermore, a configuration corresponding to some of the units included in the stated device control apparatus may be provided in the server.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described hereinafter with reference to the appended drawings. In the drawings, like constituent elements are given the same reference numerals, and redundant descriptions thereof are omitted.

Configuration of Printer Management System

Figure 1:
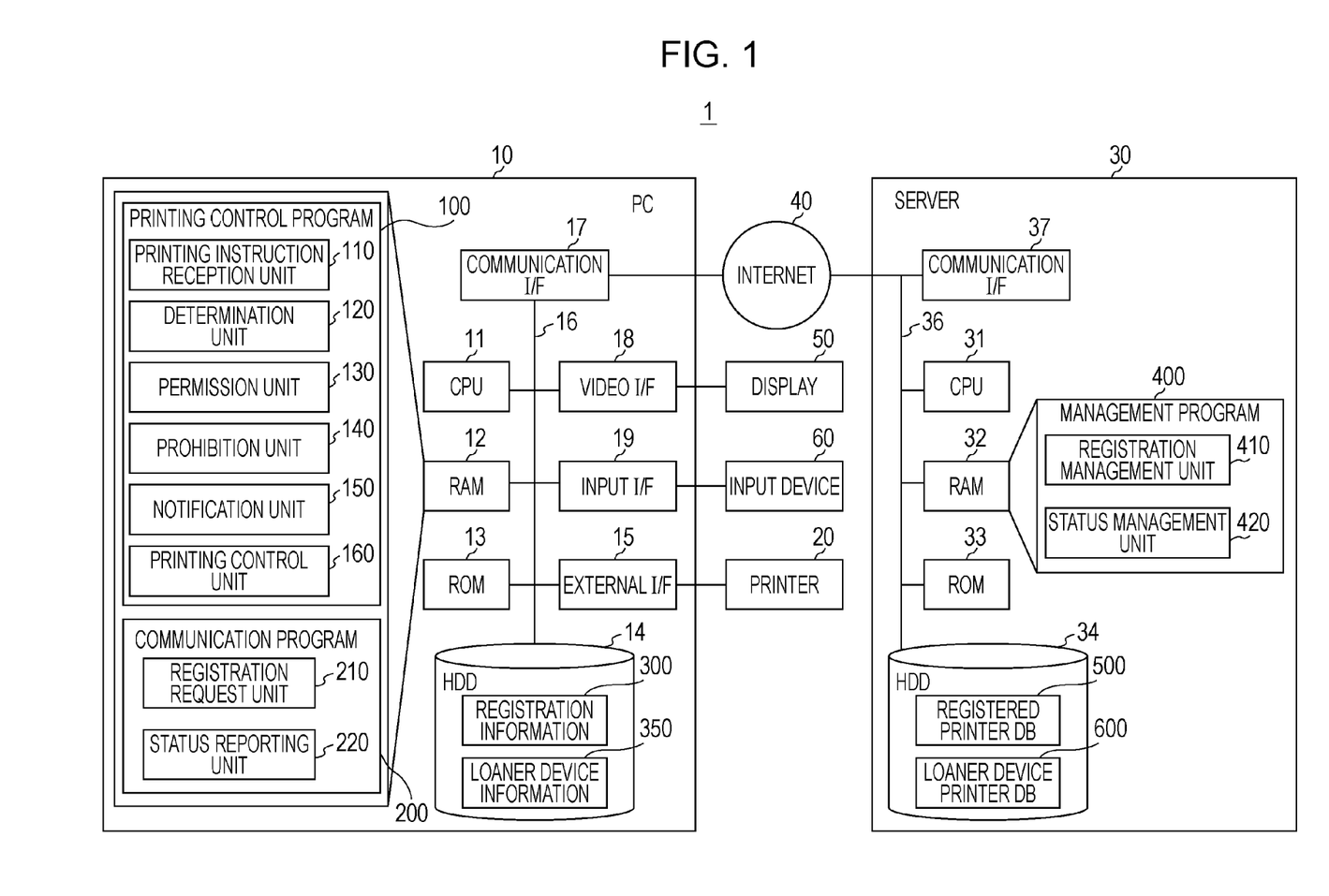
FIG. 1 is a block diagram illustrating a printer management system according to an embodiment of the invention.

A printer management system 1 is configured of a PC (personal computer) 10 embodying a device control apparatus according to the invention, and a printer 20 and a server 30, both serving as devices. The printer 20 and the server 30 are connected to each other in a communicable state via the Internet 40, serving as a communication line. Although not shown in the drawings, multiple PCs 10 can be connected to the server 30 via the Internet 40, and multiple printers 20 can be connected to a single PC 10.

In the printer management system 1, as a rule, the PC 10 permits printing to be executed by the printer 20 only in the case where that printer 20 is registered in the server 30 as a registered printer, and prohibits printing to be executed by the printer 20 in the case where that printer 20 is not a registered printer. However, as an exception, the PC 10 permits printing to be executed by the printer 20 in the case where that printer 20 is a loaner device for a registered printer.

Hereinafter, the hardware configuration of the PC 10 will be described. The PC 10 is configured so as to cause the printer 20 to execute printing in response to a printing instruction, which serves as a usage instruction for the printer 20. The PC 10 includes: a CPU 11; a RAM 12; a ROM 13; a hard disk device (HDD) 14 serving as a storage medium; an external interface (I/F) 15; an internal interface (I/F) 16; a communication interface (I/F) 17; a video interface (I/F) 18; and an input interface (I/F) 19. Programs to be launched are stored in the ROM 13. Program data (not shown) for executing various types of programs, such as a printing control program 100, a communication program 200, an OS, and the like, registration information 300 of the printer 20, and loaner device information 350 are stored in the HDD 14. The program data is loaded into the RAM 12 and is executed by the CPU 11. The printer 20 is connected to the external I/F 15. The internal I/F 16 configures an interface for enabling the CPU 11, the RAM 12, the ROM 13, the HDD 14, and the external I/F 15 to communicate with each other. The communication I/F 17, serving as a communication unit, connects the PC 10 to the server 30 via the Internet 40. The PC 10 displays various types of UI images in a display 50 via the video I/F 18, and accepts user operations made using an input device 60, such as a keyboard or a mouse, via the input I/F 19.

Next, a software configuration of the PC 10 for causing the printer 20 to execute printing based on a printing instruction will be described. The printing control program 100 is a program for causing the PC 10 to execute a function for generating printing control data based on the printing instruction and outputting the printing control data to the printer 20. To that end, the printing control program 100 includes a printing instruction reception unit 110, a determination unit 120, a permission unit 130, a prohibition unit 140, a notification unit 150, and a printing control unit 160. The communication program 200 includes a registration request unit 210 and a status reporting unit 220.

Hereinafter, the functions of the program modules 110 to 160, of which the printing control program 100 is configured, will be described. The printing instruction reception unit 110 is a program module for causing the PC 10 to execute a function for receiving a printing instruction in order to cause printing to be executed by the printer 20. In other words, through the function of the printing instruction reception unit 110, the PC 10 receives a printing instruction based on a user operation, a request from another application program, or the like. Print data to be printed, information identifying the printer 20 to be caused to execute printing, printing conditions, and so on is included in this printing instruction.

The determination unit 120 is a program module for causing the PC 10 to execute a function for determining, in the case where a printing instruction has been received, whether or not the printer 20 is a registered printer, which is a registered device that has been registered, based on the registration information 300 obtained from the server through the communication I/F 17, and whether or not the printer 20 is a loaner device for a registered printer. In other words, the PC 10 executes the following processes using the function of the determination unit 120. First, using the function of the determination unit 120, the PC 10 obtains, via the external I/F 15, the serial number of the printer 20 that has been instructed to execute printing in the printing instruction. The serial number of the printer 20 is a unique number that is given to each printer 20, and is stored in a non-volatile memory provided in the printer 20 during the process for manufacturing the printer 20. Note that the serial number of the printer 20 may be stored in the HDD 14 of the PC 10 in advance, and it may then be obtained from the HDD 14. Next, through the function of the determination unit 120, the PC 10 obtains the registration information 300 and the loaner device information 350 from the HDD 14. Then, through the function of the determination unit 120, the PC 10 compares the serial number of the printer 20 with the serial numbers of registered printers. Here, it is determined that the printer 20 is a registered printer in the case where the serial number of the printer 20 and the serial number of a registered printer match, whereas it is determined that the printer 20 is not a registered printer in the case where the serial number of the printer 20 and the serial number of a registered printer do not match.

Furthermore, through the function of the determination unit 120, the PC 10 compares the serial number of the printer 20 with the serial numbers of loaner devices for registered printers. Here, it is determined that the printer 20 is a loaner device for a registered printer in the case where the serial number of the printer 20 and the serial number of a loaner device for a registered printer match, whereas it is determined that the printer 20 is not a loaner device for a registered printer in the case where the serial number of the printer 20 and the serial number of a loaner device for a registered printer do not match.

The permission unit 130 is a program module for causing the PC 10 to execute a function for permitting printing to be executed by the printer 20 based on the printing instruction in the case where it has been determined that the printer 20 is a registered printer or a loaner device for a registered printer. In other words, if it has been determined that the printer 20 is a registered printer or a loaner device for a registered printer, the PC 10, through the function of the permission unit 130, permits the generation of the printing control data. Through this, in the case where the printer 20 is a registered printer or a loaner device for a registered printer, the printer 20 can be caused to execute printing.

The prohibition unit 140 is a program module for causing the PC 10 to execute a function for prohibiting printing from being executed by the printer 20 based on the printing instruction in the case where it has been determined that the printer 20 is not a registered printer. In other words, through the function of the prohibition unit 140, the PC 10 prohibits the printing control data from being generated through the function of the printing control unit 160 if it has been determined that the printer 20 is not a registered printer. Through this, the registration of the printer 20 can be made a prerequisite condition for printing to be executed by that printer 20.

Meanwhile, in the case where the printer 20 is a loaner device for a registered printer, the printer 20 is not prohibited from printing. Doing so makes it possible for a user to carry out printing using a loaner device, and makes it possible to avoid forcing the user to register the loaner device with the server 30. Note that the loaner device is a device that is lent out to an unspecified user in place of a printer 20 that is undergoing repairs, maintenance (for example, the replacement of an ink tank), and so on at a service center, and is by nature a device that cannot be registered as a registered printer that is associated with a specific user. Accordingly, by preventing the user from being directed to register a loaner device with the server 30, causing the user to carry out a registration request in vain can be prevented. Furthermore, the user can be prevented from experiencing displeasure by being prohibited from printing being executed by a printer 20 that has been loaned out as a loaner device.

The notification unit 150 is a program module for causing the PC 10 to execute a function for holding the printing instruction in the HDD 14 in the case where the printer 20 is neither a registered printer nor a loaner device for a registered printer and carrying out a notification prompting the user to register the printer 20 in the server as a registered printer. In other words, through the function of the notification unit 150, the PC 10 displays, in the display 50, a dialog box (a dialog box D2, shown in FIG. 3B) serving as a notification for prompting the printer 20 to be registered in the case where the printer 20 has been determined not to be a registered printer. In this manner, in the case where the printer 20 is not a registered printer, the printer 20 is prohibited from executing printing, and along therewith, the user can be invited to register the printer 20 by carrying out the notification prompting the user to register the printer 20. If the printer 20 is successfully registered, the printer 20 is then permitted to execute printing thereafter.

A button for accepting an instruction to launch the registration request unit 210 of the communication program 200, a button for accepting an instruction to cause the determination unit 120 to carry out the determination again, and a button for instructing printing to be canceled are displayed in the aforementioned dialog box; these buttons can be pressed using the input device 60. By launching the registration request unit 210 of the communication program 200, the PC 10 commences the execution of a registration request process. This registration request process is a process in which a registration request requesting the printer 20 to be registered as a registered printer is sent to the server 30 and registration information 300 and loaner device information 350 that reflect the result thereof are newly obtained. If new registration information 300 is obtained from the server 30 in the registration request process, registration information 300 and loaner device information 350 that reflect the registration request can be newly obtained from the server 30. In the registration request process of this embodiment, the registration information 300 and the loaner device information 350 are obtained from the server 30, but the registration information 300 is not obtained from the server 30 each time a printing instruction is received; this makes it possible to suppress the frequency of communication with the server 30.

As described above, the user can be invited to register the printer 20 in a smooth manner by providing a button for accepting an instruction to launch the registration request unit 210 in the aforementioned dialog box. The aforementioned dialog box is still displayed after the instruction for launching the registration request unit 210 has been accepted. Providing a button in the dialog box for accepting an instruction to cause the determination to be carried out again through the function of the determination unit 120 makes it possible for the determination to be carried out again through the function of the determination unit 120 of the printing control program 100 after the registration information 300 and the loaner device information 350 have been newly obtained in the registration request process, based on a user operation. This is because it is assumed that the user can visually confirm the progress of the registration request process and will operate the button for accepting an instruction to cause the determination to be carried out again through the function of the determination unit 120 after the registration information 300 has been newly obtained in the registration request process. It should be noted that it is necessary to accept the input of registration information or the like from the user through the function of the registration request unit 210 during the period from when the registration request process is started to when the registration information 300 and the loaner device information 350 are newly obtained, and thus the timing at which the PC 10 should cause the determination to be carried out again depends on the user. If, in this situation, an instruction for causing the determination to be carried out again through the function of the determination unit 120 is accepted, the determination can be caused to be carried out again after the registration information 300 and the loaner device information 350 have been newly obtained during the registration request process without monitoring whether or not the registration information 300 and the loaner device information 350 have been newly obtained during the registration request process. In other words, it is not necessary to monitor the progress of the registration request process during the period following the reception of the instruction for launching the registration request unit 210, which makes it possible to prevent an increase in the processing load.

The printing control unit 160 is a program module for causing the PC 10 to execute a function for, in the case where the printer 20 has been permitted to execute printing, generating print image data based on the printing instruction, and furthermore generating printing control data by sequentially executing a size conversion process, a color conversion process, a halftone process, a rearranging process, and so on on the print image data. Furthermore, through the function of the printing control unit 160, the PC 10 causes the printer 20 to execute printing based on the printing instruction by outputting the printing control data to the printer 20.

Hereinafter, the functions of the program modules 210 and 220 of which the communication program 200 is configured will be described. The registration request unit 210 is a program module for causing the PC 10 to execute the registration request process, in which a registration request requesting the printer 20 to be registered as a registered printer is sent to the server 30 and the registration information 300 and loaner device information 350 are obtained from the server 30. The serial number and model name of the printer 20 to be registered, identification information of the PC 10, a user ID, and so on are contained in this registration request. The registration information 300 and loaner device information 350 obtained from the server 30 are held in the HDD 14, without being updated, until the next registration request process is executed. Because the registration information 300 and the loaner device information 350 are not obtained each time a printing instruction is received, the frequency of communication with the server 30 can be reduced. Note that in this embodiment, it is not necessarily the case that the communication program 200 is installed in the PC 10 when the printing control program 100 is being executed by the PC 10. In this embodiment, the registration request unit 210 causing the PC 10 to execute the registration request process is a prerequisite for obtaining the registration information 300 and the loaner device information 350 once the registration request has been sent. In other words, in order to permit the printer 20 to print, it is necessary for the communication program 200 to be installed in the PC 10.

The status reporting unit 220 is a program module for causing the PC 10 to execute a function for periodically obtaining status information of the printer 20 and sending that status information to the server 30, and a function for displaying, in the display 50, maintenance information returned by the server 30 in response to the status of the printer 20. In this embodiment, ink usage amount information of the printer 20 is obtained as the status information of the printer 20, and an ink tank replacement notification is displayed in the display 50 as the maintenance information. Through this, the user can know the appropriate timing for replacing the ink tank, and can thus request a service center to replace the ink tank at the appropriate timing for replacement. Accordingly, when the printer 20 is caused to execute printing, it is recommended that the status reporting unit 220 of the communication program 200 is running.

Next, the hardware configuration of the server 30 will be described. The server 30 is configured so as to manage the registered printers. The server 30 includes a CPU 31, a RAM 32, a ROM 33, an HDD 34, and an internal I/F 36, and a communication I/F 37. Programs to be launched are stored in the ROM 33. Program data (not shown) for executing various types of programs, such as a management program 400, an OS, and the like, a registered printer database (DB) 500, and a loaner device printer DB 600 are stored in the HDD 34. The program data is loaded into the RAM 32 and is executed by the CPU 31. The internal I/F 36 configures an interface for enabling the CPU 31, the RAM 32, the ROM 33, and the HDD 34 to communicate with each other. The communication I/F 37 connects the server 30 to the PC 10 via the Internet 40.

Next, the software configuration of the server 30 will be described. The management program 400 is a program for causing the server 30 to execute a function for managing the registered printers. The management program 400 includes a registration management unit 410 and a status management unit 420.

Hereinafter, the functions of the program modules 410 and 420 of which the management program 400 is configured will be described. Through the function of the registration management unit 410, the server 30 registers the printer 20 as a registered printer by adding the serial number of the printer 20, the identification information of the PC 10, the user ID, and the model name to the registered printer DB 500 in association with each other in response to the aforementioned registration request. In the case where a single PC 10 has made registration requests for multiple printers 20, the serial numbers of the multiple printers 20 are associated with the single PC 10. Furthermore, through the function of the registration management unit 410, the server 30 sends, to the PC 10 that has sent the registration request, registration information 300 that reflects the registration of the printer 20. The serial numbers of the printers 20 registered in association with the identification information of the PC 10 that has sent the registration request are listed in this registration information 300. In the case where a single PC 10 has made registration requests for multiple printers 20, the serial numbers of the multiple printers 20 are listed in the registration information 300. On the other hand, the serial number of a printer 20 registered in response to a registration request from another PC 10 is not included in the registration information 300.

Furthermore, through the function of the registration management unit 410, the server 30 sends, to the PC 10 that has sent the registration request, the loaner device information 350. The serial numbers of loaner devices are registered in the loaner device printer DB 600 for each printer 20 model line. Through the function of the registration management unit 410, the server 30 searches the registered printer DB 500 for the model name of a registered printer that is associated with the identification information of the PC 10 that has made the registration request, and furthermore identifies the model line to which the model name that has been found belongs. The server 30 then generates the loaner device information 350, which lists the serial numbers of loaner devices associated with the model line identified in the loaner device printer DB 600, and sends that loaner device information 350 to the PC 10 that has sent the registration request. For example, in the case where a printer 20 of a new model line has been registered, the serial number of the printer 20 is added to the registration information 300, and the serial numbers of loaner devices of the model line to which the model name of the printer 20 belongs are added to the loaner device information 350. It should be noted that "model line" refers to a group into which the model name of the printer 20 has been classified based on its application or the like; professional photo store printers, large-format office printers, compact consumer printers, and so on are examples. By sending the loaner device information 350 that lists the serial numbers of loaner devices belonging to the same model line as the registered printer in this manner, printing can be permitted even in the case where a printer 20 of a different model in the same model line is lent out as a loaner device.

Through the function of the status management unit 420, the server 30 analyzes the status information of the printer 20 received from the PC 10 and returns the maintenance information of the printer 20 to the PC 10. In this embodiment, the ink usage amount information of the printer 20 is analyzed as the status information, and information for displaying an ink tank replacement notification for the printer 20 is returned as the maintenance information. Note that it is necessary for the printer 20 to be a registered printer in order for the status management unit 420 to provide the maintenance information.

Printing Control Process

Figure 2:
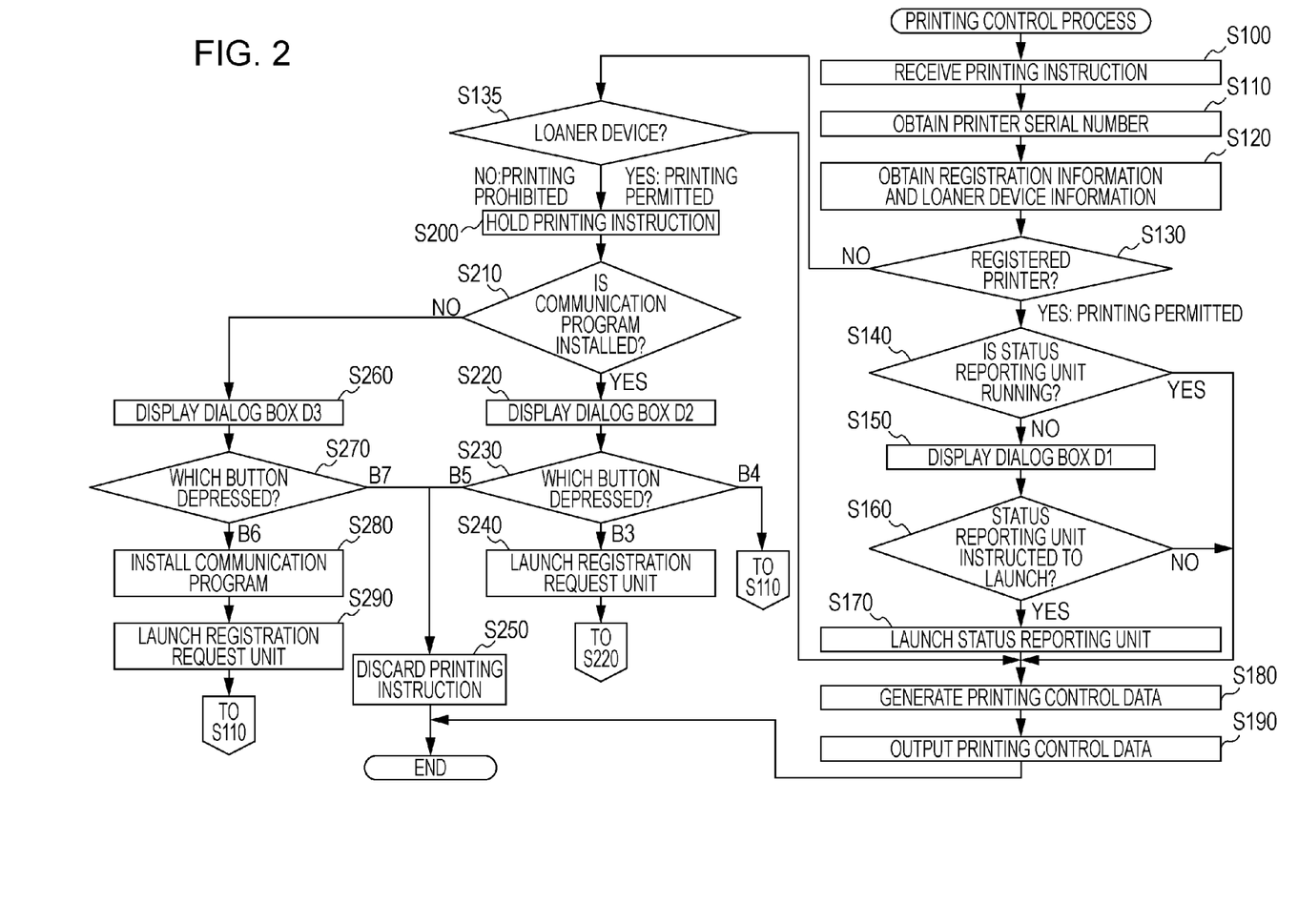
FIG. 2 is a flowchart illustrating a printing control process.

FIG. 2 is a flowchart illustrating the printing control process. First, through the function of the printing instruction reception unit 110, the PC 10 receives a printing instruction for causing the printer 20 to execute printing (S100). Next, through the function of the determination unit 120, the PC 10 obtains the serial number of the printer 20 via the external I/F 15 (S110). Because the printing instruction includes information identifying the printer 20 that is to be caused to execute printing, the printer 20 whose serial number is to be obtained is identified based on this information. Next, through the function of the determination unit 120, the PC 10 obtains the registration information 300 and the loaner device information 350 from the HDD 14 (S120).

Through the function of the determination unit 120, the PC 10 determines whether or not the serial number of the printer 20 matches any of the serial numbers of the registered printers listed in the registration information 300 (S130). The serial numbers of one or multiple registered printers that have been registered as printers 20 through which printing can be executed by the PC 10 are listed in the registration information 300, and in the case where one of the serial numbers contained in the registration information 300 matches the serial number of the printer 20 that is to be caused to execute printing, it is determined that the printer 20 that is to be caused to execute printing is a registered printer. However, in the case where no serial numbers of registered printers match the serial number of the printer 20 that is to be caused to execute printing, it is determined that the printer 20 that is to be caused to execute printing is not a registered printer.

In the case where it has been determined that the printer 20 that is to be caused to execute printing is not a registered printer, the PC 10 compares, through the function of the determination unit 120, the serial number of the printer 20 that is to be caused to execute printing and the serial numbers of the loaner devices listed in the loaner device information 350 (S135). The loaner device information 350 contains the serial numbers of loaner devices in the same model line as the registered printer registered as the printer 20 through which printing can be executed by the PC 10, and it is determined whether or not one of the serial numbers contained in the loaner device information 350 matches the serial number of the printer 20 that is to be caused to execute printing. In the case where the serial number of the printer 20 that is to be caused to execute printing and one of the serial numbers of the loaner devices listed in the loaner device information 350 match, it is determined that the printer 20 that is to be caused to execute printing is a loaner device for a registered printer. On the other hand, in the case where the serial number of the printer 20 that is to be caused to execute printing does not match any of the serial numbers of the loaner devices listed in the loaner device information 350, it is determined that the printer 20 that is to be caused to execute printing is not a loaner device for a registered printer.

In the case where it has been determined that the printer 20 that is to be caused to execute printing is a registered printer, the PC 10 permits, through the function of the permission unit 130, the printer 20 to execute printing based on the printing instruction. Then, through the function of the permission unit 130, the PC 10 determines whether or not the status reporting unit 220 of the communication program 200 is running (S140). It should be noted that because the communication program 200 and the printing control program 100 are separate programs, there are cases where the status reporting unit 220 of the communication program 200 is not running while the printing control program 100 is being executed. In the case where the status reporting unit 220 of the communication program 200 is not running, the PC 10 displays, in the display 50, a dialog box D1, through the function of the permission unit 130 (S150).

Figure 3A:
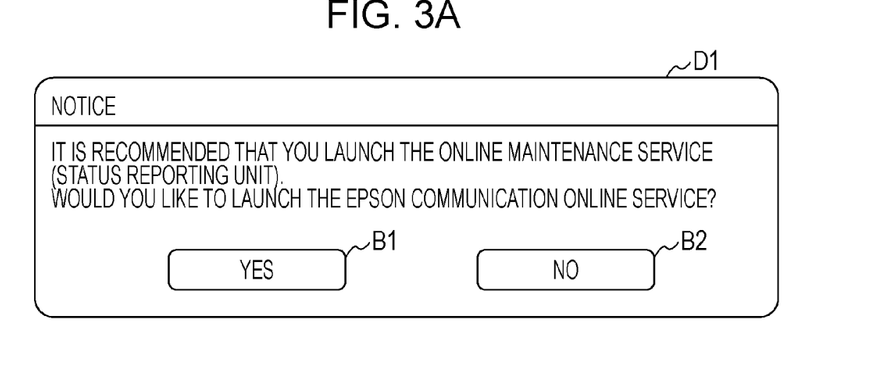
FIGS. 3A through 3C are diagrams illustrating dialog boxes.

FIG. 3A is a diagram illustrating an example of the dialog box D1. A message recommending that the status reporting unit 220 of the communication program 200 be launched is displayed in the dialog box D1; a button B1 for causing printing to be executed after launching the status reporting unit 220 and a button B2 for causing printing to be executed without launching the status reporting unit 220 are provided in a pressable state. Through the function of the permission unit 130, the PC 10 accepts the pressing of the button B1 or the button B2 while the dialog box D1 is being displayed (S160). In the case where the button B1 has been pressed, the status reporting unit 220 is launched (S170), after which the PC 10 generates the printing control data through the function of the printing control unit 160 (S180). Meanwhile, in the case where the button B2 has been pressed, the PC 10 generates the printing control data through the function of the printing control unit 160 (S180) without launching the status reporting unit 220. Through the function of the printing control unit 160, in step S180, the PC 10 generates the print image data based on the printing instruction, and then generates the printing control data by sequentially executing the size conversion process, the color conversion process, the halftone process, the rearranging process, and so on on the print image data. Furthermore, through the function of the printing control unit 160, the PC 10 causes the printer 20 to execute printing based on the printing instruction by outputting the printing control data to the printer 20 (S190).

Note that in the case where the printer 20 that is to be caused to execute printing is a loaner device for a registered printer, steps S140 through S170 are skipped, and the printing control data is generated (S180). This is because loaner devices are typically managed by a service center, and thus it is not necessary to launch the status reporting unit 220 when printing using a loaner device.

As described above, in the case where it has been determined that the printer 20 that is to be caused to execute printing is a registered printer or a loaner device for a registered printer, the printer 20 is permitted to execute printing based on the printing instruction. Meanwhile, in the case where the printer 20 that is to be caused to execute printing is a registered printer and the status reporting unit 220 of the communication program 200 is not running, it is recommended that the status reporting unit 220 is launched. When executing printing, launching the status reporting unit 220 makes it possible to provide appropriate maintenance information through the function of the status reporting unit 220.

On the other hand, in the case where the printer 20 that is to be caused to execute printing is determined to be neither a registered printer nor a loaner device for a registered printer, the generation of printing control data based on the printing instruction is prohibited by the PC 10 through the function of the prohibition unit 140. In other words, the printer 20 is not permitted to print as long as the printer 20 is neither a registered printer nor a loaner device for a registered printer, and as a rule, the printer 20 being registered as a registered printer is a prerequisite for that printer 20 to execute printing. However, as an exception, in the case where the printer 20 is a loaner device for a registered printer, the printer 20 is permitted to print. Hereinafter, a process performed in the case where the printer 20 is prohibited from printing will be described. First, through the function of the notification unit 150, the PC 10 holds the printing instruction in the HDD 14 (S200). Next, through the function of the notification unit 150, the PC 10 determines whether or not the communication program 200 is installed in the PC 10 (S210). In the case where it has been determined that the communication program 200 is installed in the PC 10, the PC 10 displays, in the display 50, the dialog box D2, through the function of the notification unit 150 (S220).

Figure 3B:
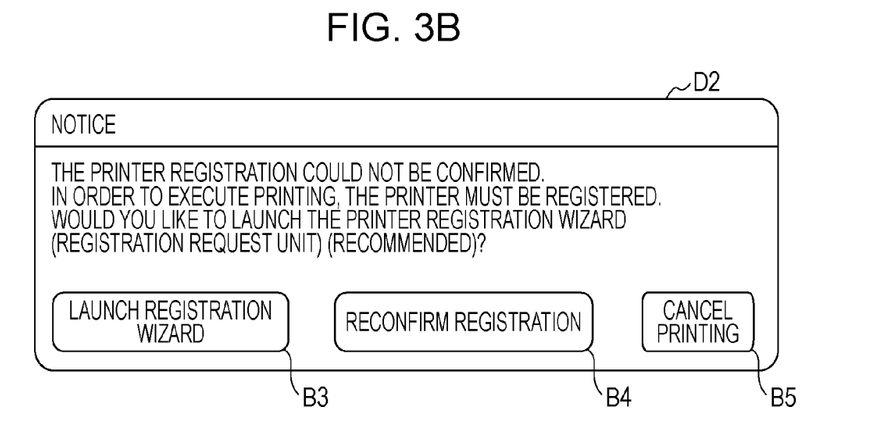

FIG. 3B is a diagram illustrating an example of the dialog box D2. A message recommending that the registration request unit 210 (a printer registration wizard) be launched is displayed in the dialog box D2; a button B3 for launching the registration request unit 210 of the communication program 200, a button B4 for again determining whether or not the printer 20 is registered through the function of the determination unit 120, and a button B5 for instructing the printing to be canceled are provided in a pressable state. Through the function of the notification unit 150, the PC 10 accepts the pressing of the buttons B3 through B5 while the dialog box D2 is being displayed (S230).

In the case where the button B3 for launching the registration request unit 210 of the communication program 200 has been pressed, the PC 10 launches the registration request unit 210 and commences execution of the registration request process through the function of the notification unit 150. When the PC 10 has launched the registration request unit 210 through the function of the printing control program 100, the process returns to step S220, where the dialog box D2 is once again displayed and the pressing of one of the buttons B3 through B5 is once again accepted (S230). In other words, before and after the execution of the registration request process, the PC 10 stands by in a state in which the dialog box D2 is displayed.

Figure 4:
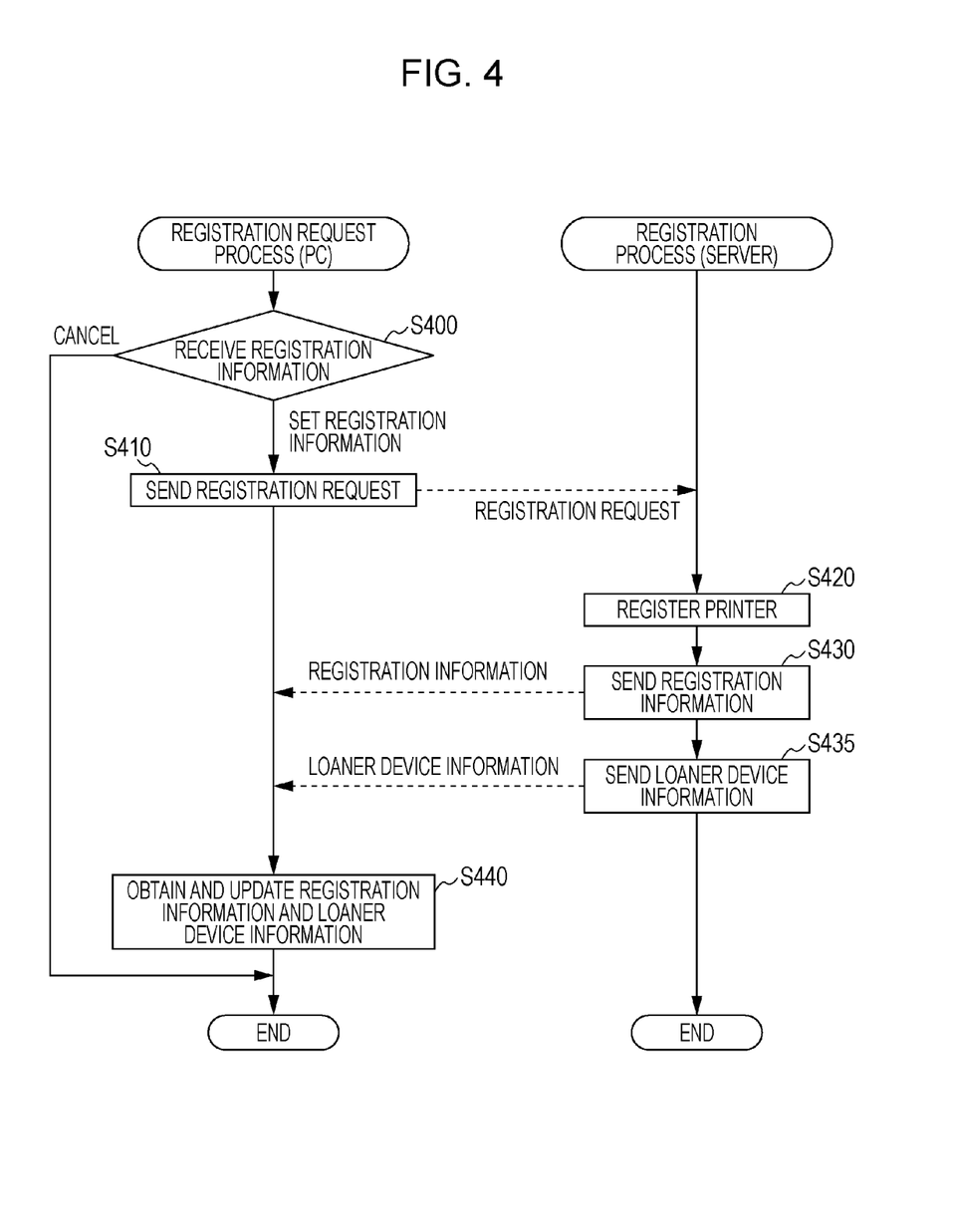
FIG. 4 is a flowchart illustrating a registration request process.

FIG. 4 is a flowchart illustrating the registration request process. In the registration request process, when the input of information regarding the user, information regarding a maintenance contract, or the like has been accepted and an operation for confirming that information has been accepted (S400), a registration request is sent to the server 30 in accordance with those operations (S410). However, if the user has performed an operation for canceling the registration request process (S400), the registration request process is ended. At least the serial number of the printer 20 to be registered, the identification information of the PC 10, the user ID, and so on are contained in the registration request. Upon receiving the registration request, the server 30 registers the printer 20 as a registered printer by storing, in the registered printer DB 500, the serial number of the printer 20, the identification information of the PC 10, and the user ID in association with each other through the function of the registration management unit 410 (S420). Furthermore, through the function of the registration management unit 410, the server 30 sends the registration information 300 to the PC 10 (S430). Specifically, the server 30 searches the registered printer DB 500 for the serial number of a registered printer associated with the identification information of the PC 10 to which the registration information 300 is to be sent, creates a list of the serial numbers of registered printers that have been found, and sends that list as the registration information 300. In the case where multiple registered printers have been registered by a single PC 10 in response to a registration request, the serial numbers of multiple registered printers are listed. Note that because the serial numbers of registered printers are associated with the identification information of the PC 10, the serial numbers of printers 20 registered by a PC 10 aside from the PC 10 that has executed the registration request process for the printer 20 are not listed even if those printers 20 are registered printers.

Furthermore, through the function of the registration management unit 410, the server 30 sends the loaner device information 350 to the PC 10 (S435). Specifically, through the function of the registration management unit 410, the server 30 searches the loaner device printer DB 600 for the serial number of a loaner device of the same model line as a registered printer associated with the identification information of the PC 10 that has made the registration request, creates a list of the found serial numbers, and sends that list as the loaner device information 350. In the case where registered printers from multiple model lines have been registered by a single PC 10 in response to a registration request, the serial numbers of loaner devices for multiple model lines are listed. Through the function of the registration request unit 210, the PC 10 obtains the registration information 300 and the loaner device information 350 received from the server 30 and updates the registration information 300 and the loaner device information 350 in the HDD 14 (S440). In this manner, the registration request process ends in a state in which the registration information 300 and the loaner device information 350 have been newly obtained.

In the case where the pressing of the button B4 for executing the determination of the registration state of the printer 20 again has been accepted in step S230 (FIG. 2), the process returns to step S110. In other words, it is once again determined whether or not the printer 20 that is to be caused to execute printing is a registered printer and whether or not the printer 20 that is to be caused to execute printing is a loaner device for a registered printer, through the function of the determination unit 120. If the registration request process is finished, it is determined that the printer 20 that is to be caused to execute printing is a registered printer, and thus the printer 20, which had been prohibited from printing, is permitted to print. Because the PC 10 holds the printing instruction in the HDD 14, the printing instruction can be obtained from the HDD 14 and the printing is executed. Because a user operation is necessary to end the registration request process, the PC 10 cannot predict the timing at which the registration request process will end, or in other words, the timing at which the determination is to be executed again. Meanwhile, because there are also cases where the registration request process is canceled without being completed due to user operations, the PC 10 can also not determine whether or not to execute the determination again. However, it is assumed that the user will press the button B4 at the point in time when the registration request process has ended, and thus the determination can be executed again after the registration request process has ended without monitoring the progress of the registration request process through, for example, interprocess communication in the period after the button B3 for launching the registration request unit 210 has been pressed.

In the case where the pressing of the button B5 for instructing the printing to be canceled has been accepted in step S230, the printing instruction held in the HDD 14 is discarded (S250), and the printing control process ends. Through this, in the case where the registration request process has been canceled, the printing control process can also be canceled.

Next, processing performed in the case where the communication program 200 is not installed in the PC 10 will be described. First, the PC 10 displays, in the display 50, a dialog box D3, through the function of the notification unit 150 (S260).

Figure 3C:
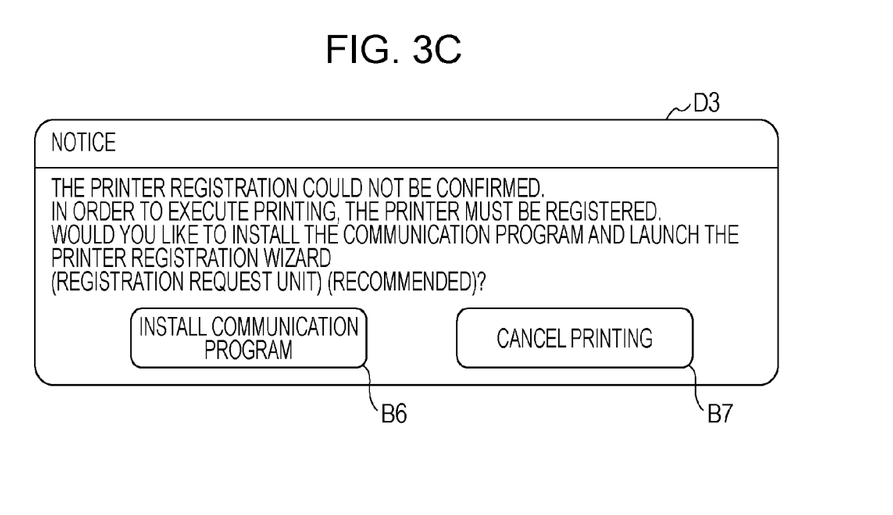

FIG. 3C is a diagram illustrating an example of the dialog box D3. A message prompting the installation of the communication program 200 to be executed is displayed in the dialog box D3; a button BE for causing the installation of the communication program 200 to be executed and a button B7 for instructing printing to be canceled are provided in a pressable state. Through the function of the notification unit 150, the PC 10 accepts the pressing of the button BE or the button B7 while the dialog box D3 is being displayed (S270).

In the case where the pressing of the button BE for causing the installation of the communication program 200 to be executed has been accepted in step S280, the communication program 200 is installed (S280) and the registration request unit 210 is then launched (S290); the process then returns to step S110. Because the process returns to step S110 after the registration request unit 210 has been launched, it is then once again determined whether or not the printer 20 that is to be caused to execute printing is a registered printer. If the registration request process is finished at this time, it is determined that the printer 20 that is to be caused to execute printing is a registered printer, and thus the printer 20, which had been prohibited from printing, is permitted to print. However, if the registration request process has not ended, the printer 20 is once again prohibited from printing, and the PC 10 stands by with the dialog box D2 displayed (S230). In other words, because the dialog box D2 is displayed after the start of the registration request process even in the case where the communication program 200 has been installed, the PC 10 can stand by until the registration request process ends without continuously inquiring as to the progress of the registration request process through the function of the printing control program 100.

In the case where the pressing of the button B7 for instructing the printing to be canceled has been accepted in step S270, the printing instruction held in the HDD 14 is discarded (S250), and the printing control process ends.

Other Embodiments

In the first embodiment, the registration information 300 and the loaner device information 350 are obtained from the server 30 in the registration request process. In other words, a process in which the PC 10 sends a registration request for the printer 20 and a process in which the PC 10 obtains the registration information 300 and the loaner device information 350 from the server 30 are carried out together. However, in the case where a technique is employed in which the PC 10 does not participate in the registration of the printer 20, such as a case where the server 30 registers the printer 20 based on a telephone call, a fax, or the like from a user, the PC 10 cannot obtain the registration information 300 and the loaner device information 350 that reflect the telephone call, fax, or the like from the server 30. Accordingly, the configuration may be such that the PC 10 is capable of executing the process for obtaining the registration information 300 and the loaner device information 350 from the server 30 separately from the sending of the registration request. For example, obtaining the registration information 300 and the loaner device information 350 from the server 30 each time a printing instruction is received (step S100 in FIG. 2) makes it possible to determine whether or not the printer 20 is a registered printer based on the registration information 300 and the loaner device information 350 that are the newest when the respective printing instructions are received. In this case, a printer 20 in whose registration the PC 10 has not participated can also be permitted to execute printing.

Furthermore, the configuration may be such that the PC 10 inquires with the server 30 as to whether or not the printer 20 specified in the printing instruction is registered each time a printing instruction is received, and the server 30 returns, as the registration information 300 and the loaner device information 350, binary information indicating whether the printer 20 is a registered printer or a loaner device for a registered printer. In this case, a program module corresponding to the determination unit 120 for determining whether the printer 20 is a registered printer or a loaner device for a registered printer based on the serial number of the printer 20 is executed by the server 30. By referring to the registered printer DB 500 and the loaner device printer DB 600 in the server 30, the program module corresponding to the determination unit 120 can determine whether the printer 20 is a registered printer or a loaner device for a registered printer based on the serial number. The dialog box D2 (a notification) prompting the registration request process to be executed by the PC 10 can then be displayed as the result of the server 30 returning a notification that the printer 20 is neither a registered printer nor a loaner device for a registered printer.

Note that the registration information 300 and the loaner device information 350 need not be individual pieces of information, and may be a single piece of data in which all of the serial numbers of the registered printers and the serial numbers of the loaner devices are listed. If any of the serial numbers listed in the stated single piece of data match the serial number of the printer 20, it can be determined that the printer 20 is a registered printer or a loaner device for a registered printer. In other words, the determination of registered printers and loaner devices can be carried out at the same time. Furthermore, the registration information 300 and the loaner device information 350 may be obtained from the server 30 at separate times. Further still, because the range of serial numbers of printers 20 that are to be used as loaner devices can be limited by the manufacturer, the loaner device information 350 may be stored in a non-volatile memory, a printing control program, or the like of the printer 20 when that printer 20 is manufactured. A loaner device determination scheme may be stored in the loaner device information 350 instead of the serial number of loaner devices. For example, in the case where a loaner device-unique code is included as specific digits of the serial number, it may be specified, in the loaner device information 350, that it is to be determined whether or not a loaner device-unique code is present as the specific digits.

Furthermore, in the aforementioned embodiments, a printer is registered as a registered device.

What is claimed is:

1. A device control apparatus comprising:
    a usage instruction acceptance unit that accepts a usage instruction for a device;
    a determination unit that, in the case where the usage instruction has been accepted, determines whether or not the device is a registered device that has been registered in a server based on registration information obtained from the server, and determines whether or not the device is a loaner device for the registered device based on loaner device information;
    a notification unit that, in the case where it has been determined that the device is not the registered device and that the device is not a loaner device for the registered device, performs a notification prompting a user to register the device as a registered device in the server;
    a prohibition unit that, in the case where it has been determined that the device is not the registered device and that the device is not a loaner device for the registered device, prohibits the device from being used in accordance with the usage instruction; and
    a permission unit that, in the case where it has been determined that the device is the registered device or that the device is a loaner device for the registered device, permits the device to be used in accordance with the usage instruction,
    wherein in the case where it has been determined that the device is the registered device or that the device is a loaner device for the registered device, the notification unit does not perform the notification.

2. The device control apparatus according to claim 1, wherein the loaner device information is obtained from the server.

3. A non-transitory storage medium in which is stored a device control program that causes a computer to:
    accept a usage instruction for a device to be used;
    determine, in the case where the usage instruction has been accepted, whether or not the device is a registered device that has been registered in a server based on registration information obtained from the server, and whether or not the device is a loaner device for the registered device based on loaner device information;
    perform a notification prompting a user to register the device as a registered device in the server in the case where it has been determined that the device is not the registered device and that the device is not a loaner device for the registered device, and not perform the notification in the case where it has been determined that the device is the registered device or it has been determined that the device is a loaner device for the registered device;
    prohibit the device from being used in accordance with the usage instruction, in the case where it has been determined that the device is not the registered device and that the device is not a loaner device for the registered device; and
    permit the device to be used in accordance with the usage instruction, in the case where it has been determined that the device is the registered device or that the device is a loaner device for the registered device.

* * * * *